(12) United States Patent
Lee et al.

(10) Patent No.: US 12,525,653 B2
(45) Date of Patent: Jan. 13, 2026

(54) ELECTRODE ASSEMBLY AND SECONDARY BATTERY COMPRISING SAME

(71) Applicant: Samsung SDI Co., Ltd., Yongin-si (KR)

(72) Inventors: Jae Wook Lee, Yongin-si (KR); Sung Hyun Choi, Yongin-si (KR); Chul Hwan Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 621 days.

(21) Appl. No.: 17/596,254

(22) PCT Filed: May 12, 2020

(86) PCT No.: PCT/KR2020/006225
§ 371 (c)(1),
(2) Date: Dec. 6, 2021

(87) PCT Pub. No.: WO2020/256281
PCT Pub. Date: Dec. 24, 2020

(65) Prior Publication Data
US 2022/0311057 A1 Sep. 29, 2022

(30) Foreign Application Priority Data
Jun. 17, 2019 (KR) .................. 10-2019-0071736

(51) Int. Cl.
*H01M 50/466* (2021.01)
*H01M 10/0587* (2010.01)
*H01M 50/59* (2021.01)

(52) U.S. Cl.
CPC ..... *H01M 10/0587* (2013.01); *H01M 50/466* (2021.01); *H01M 50/59* (2021.01)

(58) Field of Classification Search
CPC ........... H01M 10/0585; H01M 50/463; H01M 50/59; H01M 10/0431; H01M 50/466
See application file for complete search history.

(56) References Cited

U.S. PATENT DOCUMENTS 7,931,980 B2    4/2011  Kwak et al.
10,096,856 B2  10/2018  Kwon et al.
(Continued)

FOREIGN PATENT DOCUMENTS

JP    2001283897 A  * 10/2001
JP    2006-179370 A    7/2006
(Continued)

OTHER PUBLICATIONS

Translation of Takahashi (Year: 2001).*
(Continued)

*Primary Examiner* — Nicholas A Smith
*Assistant Examiner* — Zackary Richard Cochenour
(74) *Attorney, Agent, or Firm* — Womble Bond Dickinson (US) LLP

(57) ABSTRACT

The present invention relates to an electrode assembly and a secondary battery comprising same, wherein an insulator formed on a separator can prevent burrs, which may occur on a positive or negative electrode tab formed by blanking, from penetrating the separator, thereby improving electric stability, and a longitudinal end and a corner portion have increased insulation thicknesses such that, by enhancing cushion functions, same may be advantageous in terms of short-circuiting protection. As an example, the present invention provides an electrode assembly and a secondary battery comprising same, the electrode assembly comprising: a positive-electrode collector; a positive-electrode plate having a positive-electrode active material and a positive-electrode tab protruding from a longitudinal end thereof, the (Continued)

positive-electrode active material being formed to cover a part of the positive-electrode collector, and the positive-electrode tab being a positive-electrode uncoated portion having no positive-electrode active material formed thereon; a negative-electrode collector; a negative-electrode plate having a negative-electrode active material and a negative-electrode tab protruding from a longitudinal end thereof, the negative-electrode active material being formed to cover a part of the negative-electrode collector, and the negative-electrode tab being a negative-electrode uncoated portion having no negative-electrode active material formed thereon; and a negative-electrode plate. The separator has an insulator provided on a longitudinal end thereof so as to have a larger thickness than other areas thereof.

12 Claims, 10 Drawing Sheets

(56) References Cited

U.S. PATENT DOCUMENTS

| | | | |
|---|---|---|---|
| 2006/0051662 A1 | 3/2006 | Kwak et al. | |
| 2009/0208832 A1* | 8/2009 | Beard | H01M 10/0459 156/194 |
| 2011/0014509 A1 | 1/2011 | Kim | |
| 2011/0217590 A1* | 9/2011 | Nakano | H01M 4/13 429/208 |
| 2014/0242433 A1 | 8/2014 | Kwon et al. | |
| 2019/0252726 A1* | 8/2019 | Eom | H01M 50/538 |
| 2020/0168874 A1* | 5/2020 | Kim | H01M 50/46 |
| 2020/0303782 A1 | 9/2020 | Yatomi | |

FOREIGN PATENT DOCUMENTS

| | | | | |
|---|---|---|---|---|
| JP | 2011-216403 A | | 10/2011 | |
| JP | 2017059326 A | * | 3/2017 | |
| KR | 10-2005-0123366 A | | 12/2005 | |
| KR | 10-2011-0007524 A | | 1/2011 | |
| KR | 10-1168651 B1 | | 7/2012 | |
| KR | 10-2014-0074220 A | | 6/2014 | |
| KR | 10-1446160 B1 | | 10/2014 | |
| KR | 10-1613019 B1 | | 4/2016 | |
| KR | 10-1628892 B1 | | 6/2016 | |
| KR | 10-2017-0025772 A | | 3/2017 | |
| WO | WO 2017/163932 A1 | | 9/2017 | |
| WO | WO-2018048165 A1 | * | 3/2018 | H01M 10/04 |

OTHER PUBLICATIONS

Machine translation of KR 20170025772A (Jung) from Espacenet (Year: 2017).*
International Search Report for PCT/KR2020/006225 dated Aug. 18, 2020, with English translation, 6 pages.
Korean Office Action dated Jun. 20, 2024 for corresponding Korean Patent Application No. 10-2019-0071736, 7 pages.
Korean Office Action dated Feb. 13, 2025 for corresponding Korean Patent Application No. 10-2019-0071736, 7 pages.

* cited by examiner

ELECTRODE ASSEMBLY AND SECONDARY BATTERY COMPRISING SAME

CROSS-REFERENCE TO RELATED APPLICATION(S)

This application is a U.S. National Phase Patent Application of International Application Number PCT/KR2020/006225, filed on May 12, 2020, which claims priority of Korean Patent Application Number 10-2019-0071736, filed on Jun. 17, 2019, the entire content of each of which is incorporated herein by reference.

TECHNICAL FIELD

Various embodiments of the present invention relate to an electrode assembly and a secondary battery comprising same.

BACKGROUND ART

A secondary battery is a power storage system that provides excellent energy density for converting electrical energy into chemical energy and storing same. Compared to primary batteries that are not rechargeable, secondary batteries are rechargeable and are widely used in IT devices such as smartphones, cellular phones, laptops, and tablet PCs. Recently, interest in electric vehicles has increased to prevent environmental pollution, and thus, high-capacity secondary batteries are being adopted for electric vehicles. Such secondary batteries are required to have characteristics such as high density, high output, and stability.

The above information disclosed in this Background section is only for enhancement of understanding of the background of the invention and therefore it may contain information that does not constitute prior art.

DESCRIPTION OF EMBODIMENTS

Technical Problem

The present invention provides an electrode assembly and a secondary battery comprising same, wherein an insulator formed on a separator can prevent burrs, which may occur on a positive or negative electrode tab formed by blanking, from penetrating the separator, thereby improving electric stability.

In addition, the present invention provides an electrode assembly and a secondary battery comprising same, wherein a longitudinal end and a corner portion have increased insulation thicknesses such that, by enhancing cushion functions, same may be advantageous in terms of short-circuiting protection.

Solution to Problem

In an electrode assembly according to an embodiment of the present invention and a secondary battery comprising same, the electrode assembly may include a positive-electrode collector, a positive-electrode plate which has a positive-electrode active material and a positive-electrode tab protruding from a longitudinal end thereof, the positive-electrode active material being formed to cover a part of the positive-electrode collector, and the positive-electrode tab being a positive-electrode uncoated portion having no positive-electrode active material formed thereon, a negative-electrode collector, a negative-electrode plate which has a negative-electrode active material and a negative-electrode tab protruding from a longitudinal end thereof, the negative-electrode active material being formed to cover a part of the negative-electrode collector, and the negative-electrode tab being a negative-electrode uncoated portion having no negative-electrode active material formed thereon, and a separator which is interposed between the positive-electrode plate and the negative-electrode plate, and the separator has an insulator provided on a longitudinal end thereof so as to have a larger thickness than other areas thereof.

The insulator may be formed by bending one end of the separator at least once.

The insulator may be formed by folding the one end of the separator at least twice or winding same by one or more turns.

The insulator may be formed by applying a separate insulating material to one end of the separator or attaching same in the form of a tape.

The thickness of the insulator may be the same as or smaller than the thickness of the positive- or negative-electrode active material.

The separator may further include an additional insulator that is thicker than an area having a different thickness at the other end in the longitudinal direction.

The additional insulator may be formed to have the same thickness or the same shape as the insulator.

The electrode assembly may have a rectangular parallelepiped shape in which the positive-electrode plate, the separator, the negative-electrode plate, and the separator are sequentially stacked multiple times.

The electrode assembly may be formed in a jelly-roll configuration in which the positive-electrode plate, the separator, the negative-electrode plate and the separator are stacked and then wound.

Advantageous Effects of Disclosure

The electrode assembly and the secondary battery comprising same, according to various embodiments of the present invention can prevent burrs, which may occur on a positive or negative electrode tab formed by blanking, from penetrating the separator, by means of the insulator formed on the separator, thereby improving electrical safety.

That is, various embodiments of the present invention provide an electrode assembly and a secondary battery comprising same, which can prevent short-circuiting with another electrode plate due to burrs having occurred on the positive or negative electrode tab by means of the insulator provided at a longitudinal end of the separator.

In addition, in an electrode assembly and a secondary battery comprising same, according to various embodiments of the present invention, a longitudinal end and a corner portion have increased insulation thicknesses such that, by enhancing cushion functions, same may be advantageous in terms of short-circuiting protection.

BEST MODE

Figure 1A:
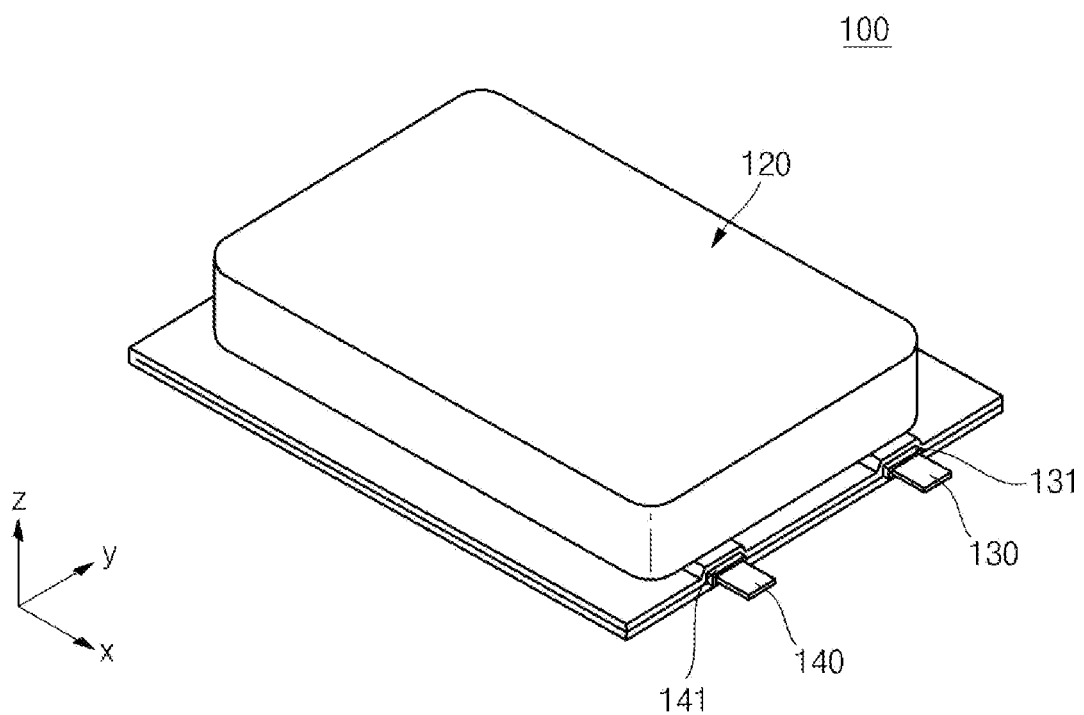
FIGS. 1A and 1B are an exploded perspective view and a perspective view illustrating an exemplary secondary battery.

Hereinafter, example embodiments of the present disclosure will be described in detail.

Embodiments of the present invention are provided to more completely explain the present invention to one skilled in the art, and the following example embodiments may be modified in various other forms and the present invention should not be construed as being limited to the embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or and/or "comprising" when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 1B:
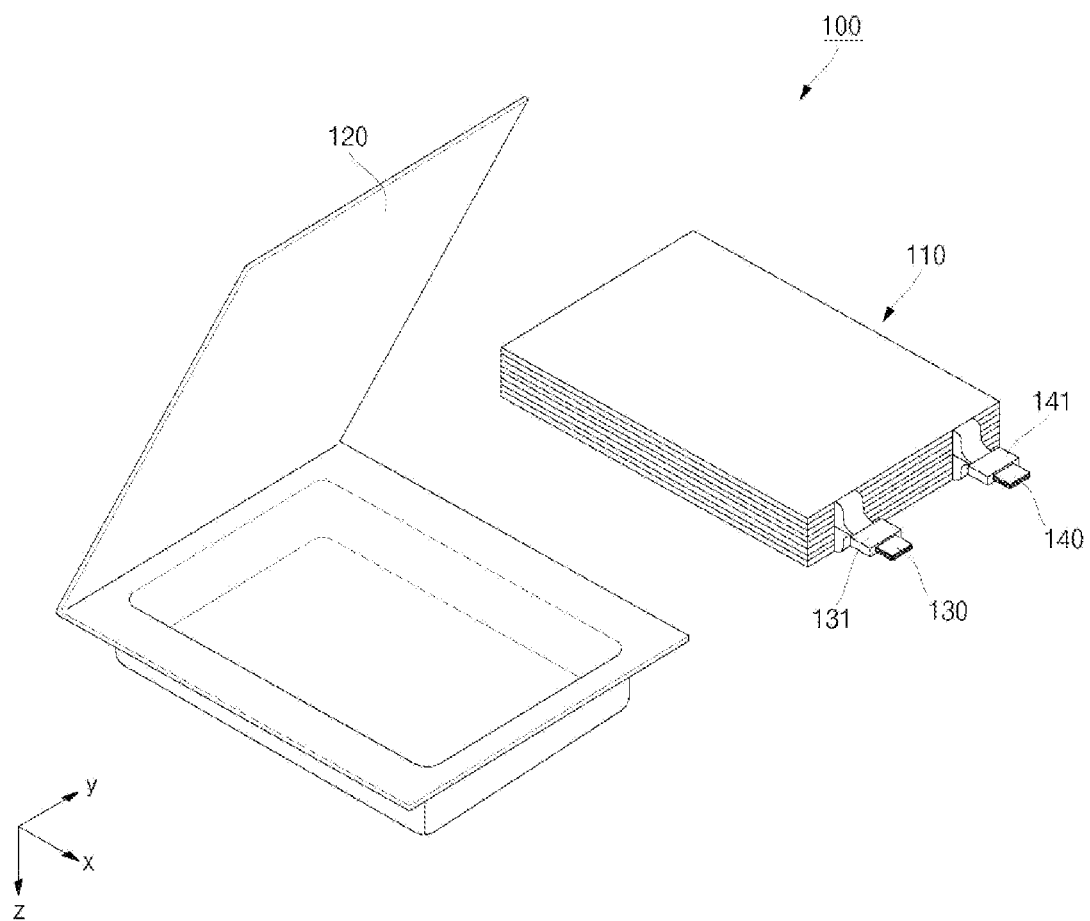

FIGS. 1A and 1B are an exploded perspective view and a perspective view illustrating an exemplary secondary battery 100. As shown in FIGS. 1A and 1B, the secondary battery 100 includes an electrode assembly 110 and a case 120 in which the electrode assembly 110 is accommodated. The electrode assembly 110 is accommodated in the case 120 together with an electrolyte (not shown).

The case 120 may include a pouch body 121 and a pouch cover 122 in which a rectangular pouch film is folded in the longitudinal direction (x). In addition, in the case 120, the electrode assembly 110 may be accommodated in a receiving portion provided in the pouch body 121, and the pouch cover 122 may then be folded to be coupled and sealed to the pouch body 121.

Here, the case 120 is illustrated in a pouch shape but may be formed in a cylindrical or prismatic shape. In addition, when the case 120 has a prismatic or cylindrical shape, the electrode assembly 110 may first be accommodated in the case 120, and the cap assembly may then be coupled to the cylindrical or prismatic case, thereby sealing the case. In the present invention, the shape of the case 120 is not limited to a pouch.

Figure 2A:
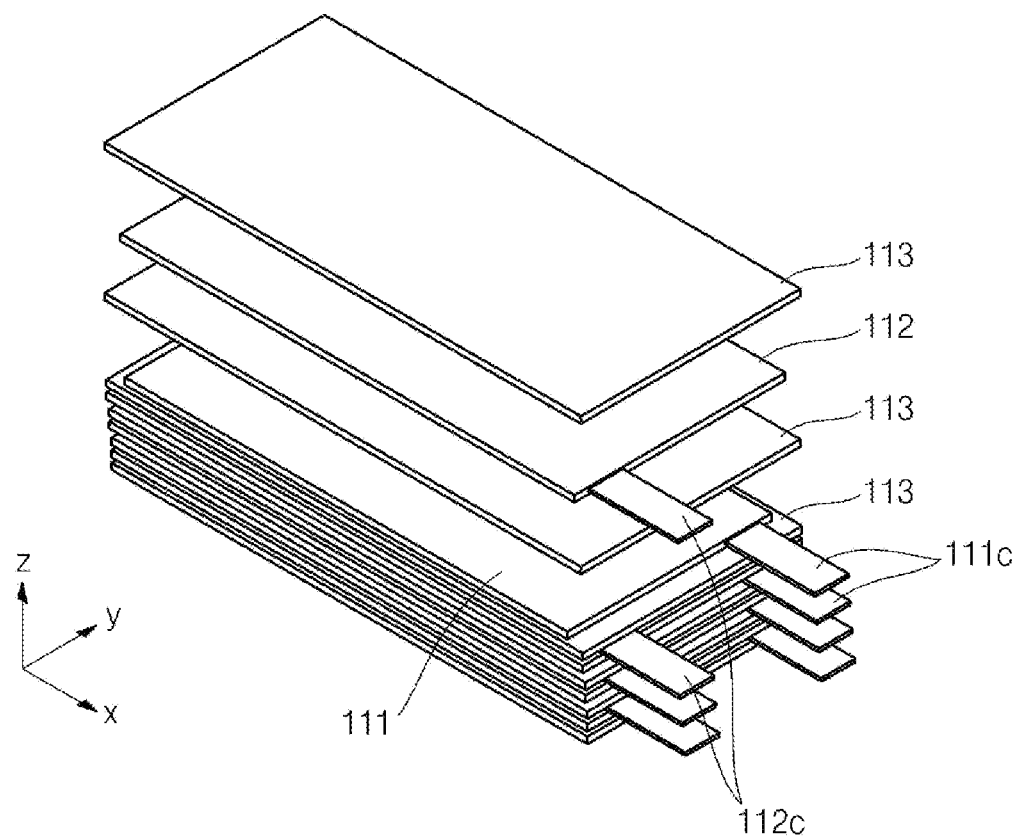
FIGS. 2A and 2B are an exploded perspective view and a perspective view illustrating an example of an electrode assembly that can be applied to the secondary battery shown in FIG. 1B.
Figure 2B:
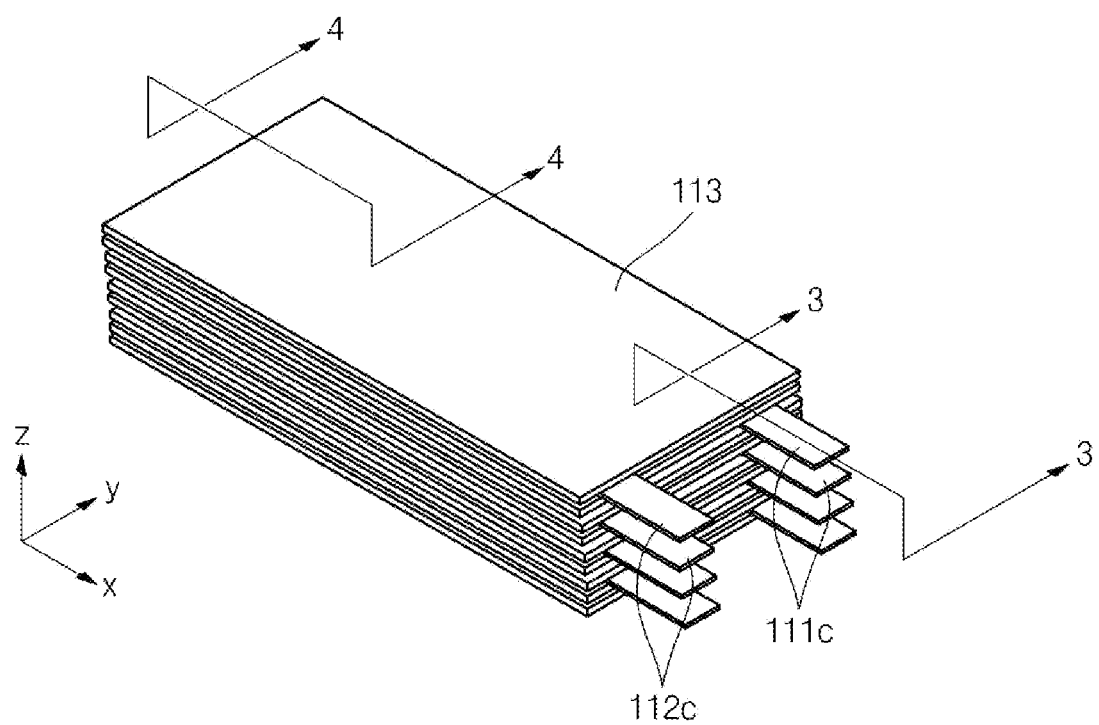
Figure 3A:
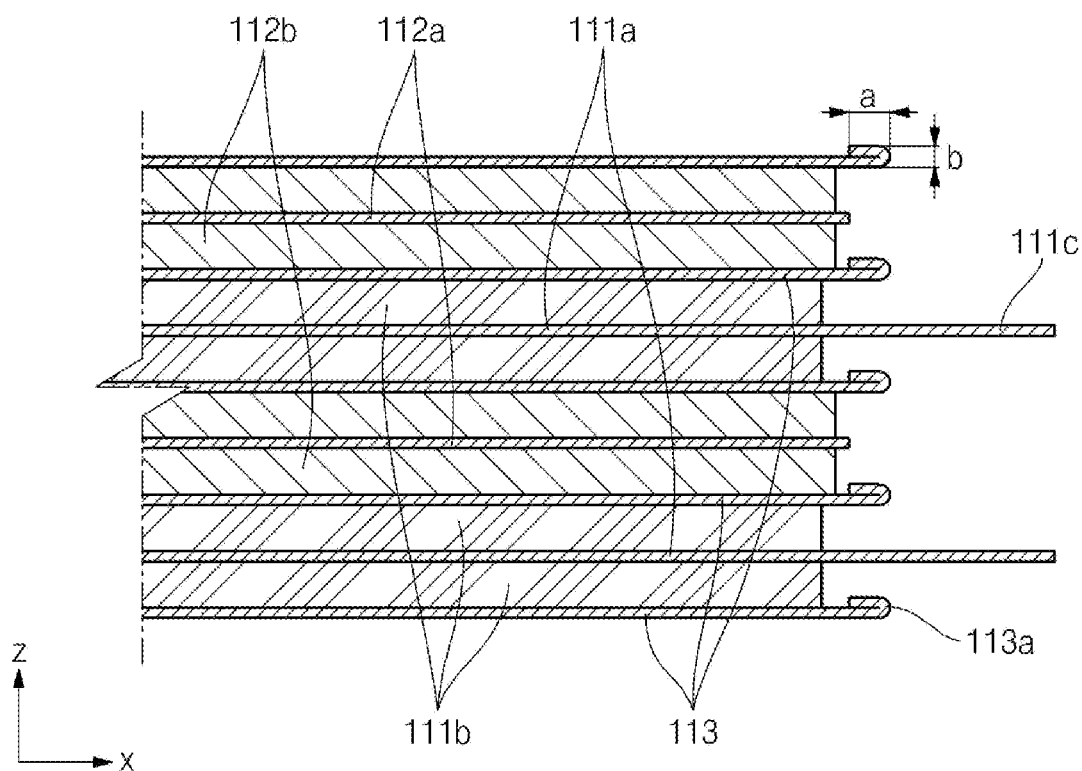
FIGS. 3A to 3D show various examples of cross-sectional views taken along line 3-3 in FIG. 2B.
Figure 3B:
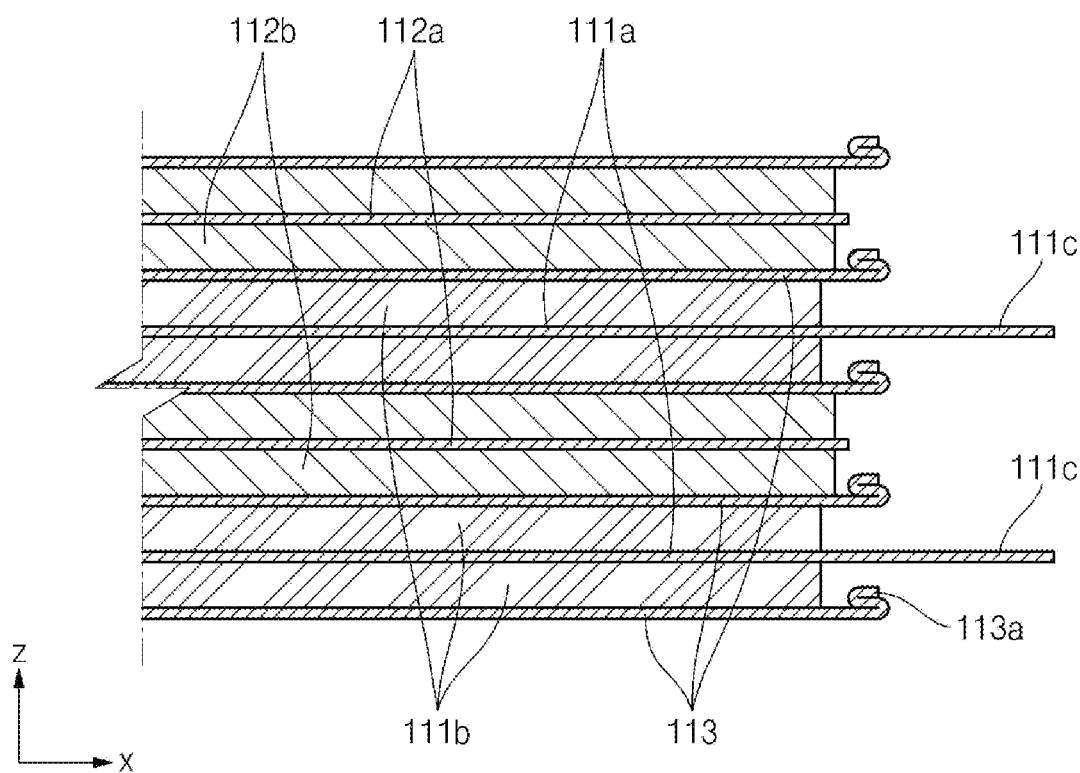
Figure 3C:
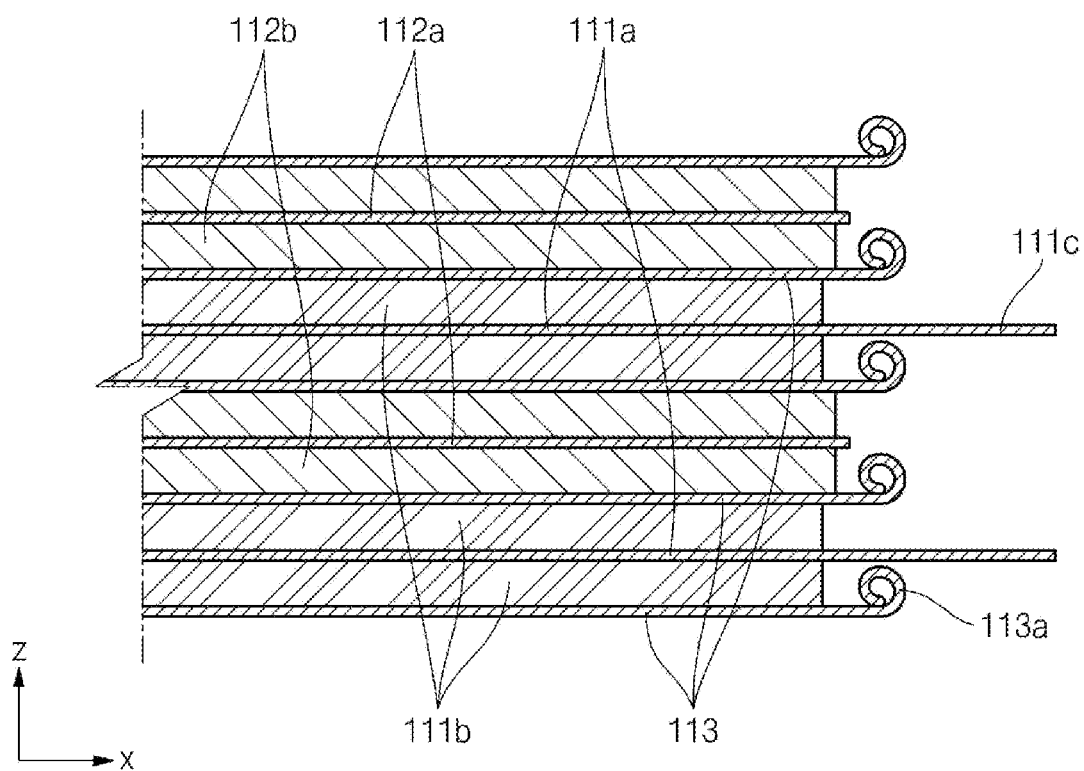

FIGS. 2A and 2B are an exploded perspective view and a perspective view illustrating an example of an electrode assembly that can be applied to the secondary battery shown in FIG. 1B. In addition, FIGS. 3A to 3D show various examples of cross-sectional views taken along line 3-3 in FIG. 2B, and FIGS. 4A and 4B show various examples of cross-sectional views taken along line 4-4 in FIG. 2B. Hereinafter, the electrode assembly 110 will be described in detail with reference to FIGS. 1B, 2A to 2B, 3A to 3D, and 4A to 4B.

The electrode assembly 110 may be formed in a rectangular parallelepiped shape in which a positive-electrode plate 111, a separator 113, and a negative-electrode plate 112, which are shaped of a thin plate or a film, are sequentially stacked. That is, the electrode assembly 110 may be formed in a rectangular parallelepiped shape in which the separator 113, the positive-electrode plate 111, the separator 113, and the negative-electrode plate 112 are sequentially stacked multiple times in the height direction (x).

The positive-electrode plate 111 is formed by coating a positive-electrode active material 111$b$ such as graphite or carbon on a positive-electrode collector 111$a$ formed of a metal foil such as aluminum. The positive-electrode active material 111$b$ may be formed on one or both surfaces of the positive-electrode collector 111$a$, but the present invention is not limited thereto. In addition, the positive-electrode collector 111$a$ includes a positive-electrode uncoated portion 111$c$ that is a region to which the positive-electrode active material 111$b$ is not applied. In addition, the positive-electrode uncoated portion 111$c$ may be a positive-electrode tab 111$c$ that is a passage for current flow between the positive-electrode plate 111 and the outside of the positive electrode. The positive-electrode tab 111$c$ may protrude from one end of the positive-electrode plate 111 in the longitudinal direction (x). In addition, the positive-electrode tab 111$c$ may be positioned at one side in the width direction (y) at one end of the longitudinal direction (x). The positive-electrode tabs 111$c$ of a plurality of stacked positive-electrode plates 111 may be aligned at the same position in the height direction (z) in the electrode assembly 110.

In addition, the plurality of positive-electrode tabs 111$c$ may be electrically connected to one positive-electrode lead tab 130 and may outwardly extend and protrude from the inside of the case 120. The positive-electrode lead tab 130 may have a flat plate shape that is thicker than the positive-electrode tab 111c. In addition, an insulating tape 131 may be further interposed between a positive-electrode lead tab 130 and the case 120. The insulating tape 131 may secure an electrically insulating state between the case 120 and the positive-electrode lead tab 130.

The positive-electrode plate 111 is formed by coating the positive-electrode active material 111b on the positive-electrode collector 111a, which is a roll-shaped metal foil, and is then separated into an individual positive-electrode plate 111 having one positive-electrode tab 111c formed by blanking. In the present invention, the material of the positive-electrode plate 111 is not limited. In addition, the positive-electrode plate 111 may be smaller than the negative-electrode plate 112 in the longitudinal (x) and width (y) directions in consideration of the lithium ion precipitation that may occur intermittently in the negative-electrode plate 112 during charging. That is, the negative-electrode plate 112 may be larger than the positive-electrode plate 111 in a plan view.

The negative-electrode plate 112 is formed by applying a negative-electrode active material 112b such as a transition metal oxide to the negative-electrode current collector plate 112a formed of a metal foil such as copper or nickel, and includes a negative-electrode uncoated portion 112c, which is a region where the second active material is not applied. The negative-electrode uncoated portion 112c may be a negative-electrode tab 112c, which is a passage of current flow between the negative-electrode plate 112 and the outside of the negative electrode. The negative-electrode tab 112c may protrude from one end of the negative-electrode plate 112 in the longitudinal direction (x). In addition, the negative-electrode tab 112c may be located at one end in the longitudinal direction (x) and the other side in the width direction (y). That is, the negative-electrode tab 112c may protrude in the same direction as the positive-electrode tab 111c and may be disposed parallel to the positive-electrode tab 111c. The negative-electrode tabs 112c of the plurality of stacked negative-electrode plates 112 may be aligned at the same position in the height direction (z) in the electrode assembly 110.

The negative-electrode plate 112 is formed by coating the positive-electrode active material 112b on the second electrode collector 112a, which is a roll-shaped metal foil, and is then separated into an individual negative-electrode plate 112 having one negative-electrode tab 112c formed by blanking. In the present invention, the material of the negative-electrode plate 112 is not limited.

In addition, the plurality of negative-electrode tabs 112c may be electrically connected to one negative-electrode lead tab 140, and may outwardly extend and protrude from the case 120 to the outside. The negative lead tab 140 may have a flat plate shape that is thicker than the negative-electrode tab 112c. In addition, an insulating tape 141 may be further interposed between the negative-electrode lead tab 140 and the case 120. The insulating tape 141 may secure an electrically insulating state between the case 120 and the negative-electrode lead tab 140.

The separator 113 is positioned between the positive-electrode plate 111 and the negative-electrode plate 112 to prevent an electric short and to enable the movement of transition metal ions, and is made of polyethylene, polypropylene, or a composite film of polyethylene and polypropylene. Meanwhile, in the present invention, the material of the separator 113 is not limited.

In order to more securely prevent a short circuit between the positive-electrode plate 111 and the negative-electrode plate 112, the separator 113 may be formed to have a wider width and longer length than the positive-electrode plate 111 and the negative-electrode plate 112 in both of the longitudinal direction (x) and the width direction (y). That is, the separator 113 may be larger than the positive-electrode plate 111 and the negative-electrode plate 112 in a plan view.

In addition, the separator 113 may be formed to have a larger thickness at one end in the longitudinal direction (x) than other areas of the separator 113. Here, an insulator 113a may overlap one area of each of the positive-electrode tab 111c and the negative-electrode tab 112c in the height direction (z). The insulator 113a may overlap an area of the positive-electrode tab 111c adjacent to the positive-electrode collector 111a in the height direction (z), and an area of the negative-electrode tab 112c adjacent to the negative-electrode collector 112a in the height direction (z).

The insulator 113a may prevent burrs, which may occur on the electrode tab 111c, 112c formed by blanking, from penetrating the separator 113. That is, by increasing the thickness of one end of the separator 113 in the longitudinal direction (x) by the insulator 113a, electrical insulation against the burrs and strength can be improved.

The insulator 113a may be formed by bending or winding one end of the separator 113 upward or downward. The thickness of the separator 113 may be any one in the range of 10 to 50 μm, and the thickness b of the insulator 113a may be any one in the range of 20 to 180 μm. Here, when the thickness of the insulator 113a is less than 20 μm, an electrical short circuit between the other electrode plates 112 and 111 cannot be prevented due to burrs of the electrode tabs 111c and 112c formed by blanking, and when the thickness of the insulator 113a is greater than 180 μm, the thickness of the insulator 113a is greater than that of the positive or negative active materials 111b and 112b, which may lead to an unnecessary increase in the thickness of the electrode assembly. That is, the thickness of the insulator 113a is preferably equal to or smaller than that of the positive and negative active materials 111b and 112b.

In addition, the length in the longitudinal direction (x) of the insulator 113a may be any one in the range of 0.01 mm to 5 mm, and more preferably any one in the range of 0.01 mm to 1 mm. Here, when the length of the insulator (113a) in the longitudinal direction (x) is smaller than 0.01 mm, an electrical short with the other electrode plates 112 and 111 is prevented due to burrs of the electrode tabs 111c and 112c formed by blanking, and when the length of the insulator (113a) in the longitudinal direction (x) is greater than 5 mm, the size of electrode assembly may unnecessarily increase.

The insulator 113a may be formed by bending or winding one end of the separator 113. As shown in FIG. 3A, the insulator 113a may be formed by bending one end of the separator 113 upward once, or, as shown in FIG. 3B, the insulator 113a may be formed by folding one end of the separator 113 in the longitudinal direction (x) of the separator 113 twice or more. In addition, the insulator 113a may be formed by winding one end of the separator 113 in the longitudinal direction (x) by at least one turn, as shown in FIG. 3C. In addition, in FIGS. 3A to 3C, the insulator 113a may have the longitudinal (x) end of the separator 113 upwardly bent or wound or downwardly bent or wound, but the present invention is not limited thereto.

Figure 3D:
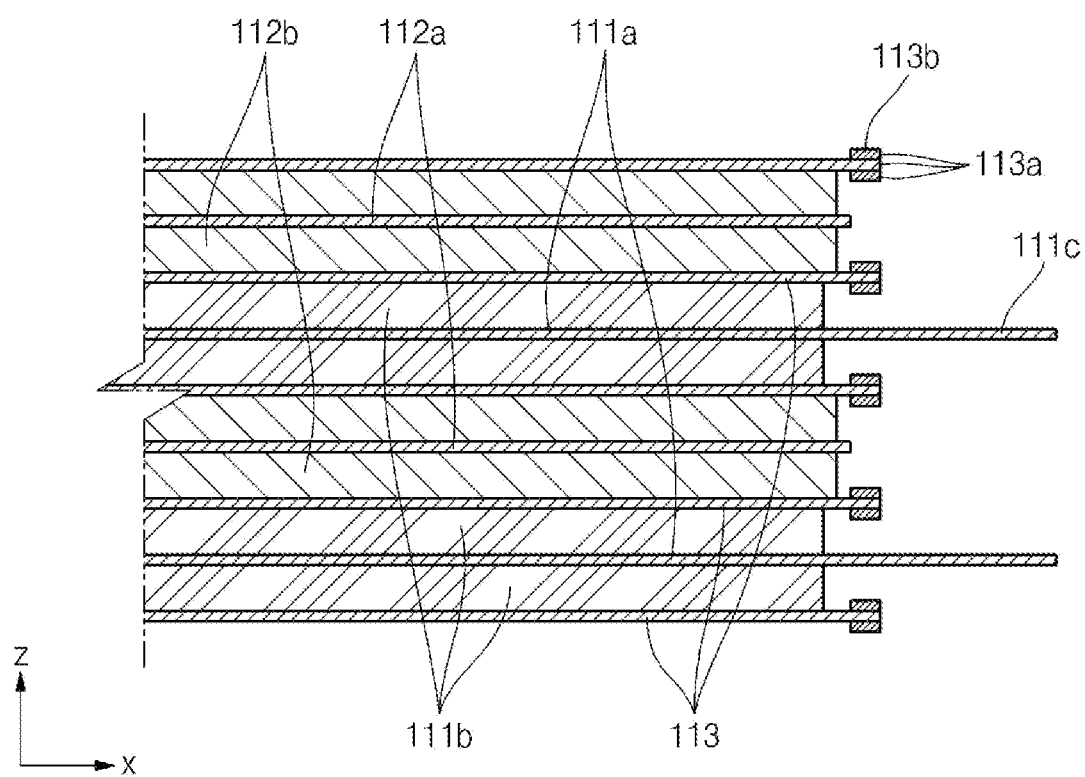
Figure 4A:
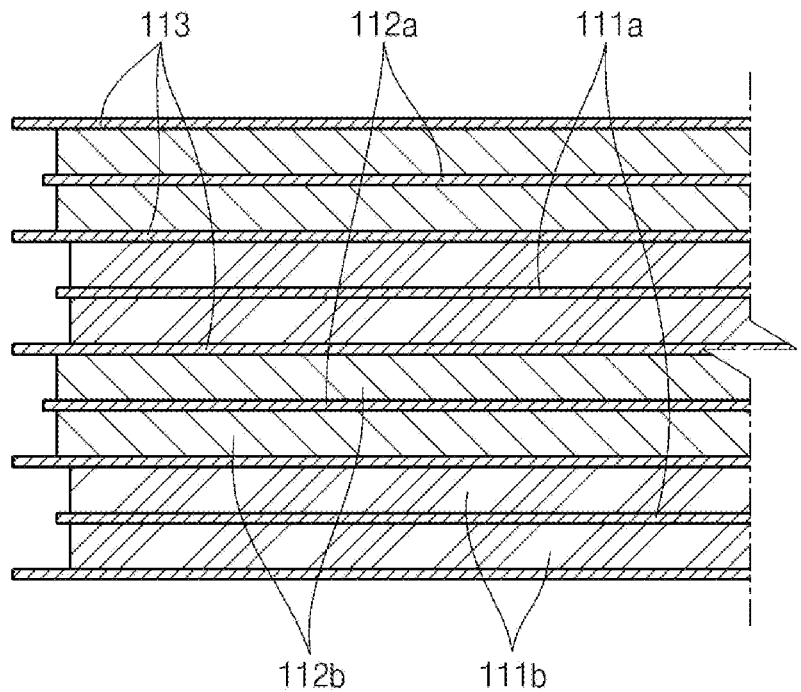
FIGS. 4A and 4B show various examples of cross-sectional views taken along line 4-4 in FIG. 2B.
Figure 4B:
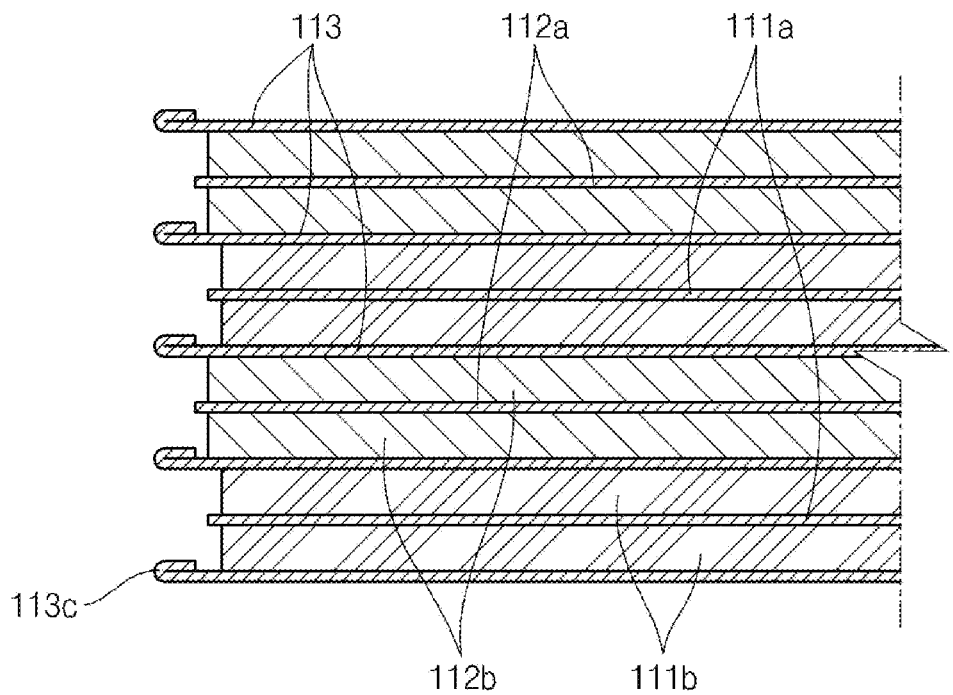

Additionally, as shown in FIG. 3D, the insulator 113a may be formed by applying a separate insulator 113b to one end of the separator 113 or may be attached in the form of a tape. Here, the insulator 113a may be made of polyimide, but the present invention is not limited thereto.

As shown in FIG. 4A, the other end of the separator 113 in the longitudinal direction (x) may have the same thickness as other portions of the separator 113 except for the insulator 113a. That is, the separator 113 may an insulator 113a having a thickness that is large only at one end thereof in the longitudinal direction (x).

In addition, as shown in FIG. 4B, the second end of the separator 113 in the longitudinal direction (x) may also have a larger thickness than the separator 113. That is, the separator 113 may further include an additional insulator 113c formed by bending or winding the other end thereof in the longitudinal direction (x). The additional insulator 113c may be formed by bending the other end of the separator 113 upward once.

That is, the additional insulator 113c may be formed by folding or winding the other end in the longitudinal direction (x) of the separator 113 twice or more, like the shape of one end in the longitudinal direction (x) of the separator 113 shown in FIGS. 3B and 3C. In addition, as shown in FIG. 3D, the additional insulator 113c may be formed by applying a separate insulator, like the one end of the separator 113 in the longitudinal direction (x), or by attaching same in the form of a tape. Preferably, the additional insulator 113c may have the same shape or the same thickness as that of the insulator 113a.

Here, by the additional insulator 113c provided at the other end of the separator 113, the secondary battery 100 may have increased stability on the other side in the longitudinal direction due to an external impact caused by a drop, etc. That is, by the insulator 113a and the additional insulator 113c, the electrode assembly 110 may have an increased insulation thickness at both ends and corners in the longitudinal direction (x), enhancing a cushion function, which may be advantageous from a short circuit.

The electrode assembly 110 may be accommodated in the case 120 together with an electrolyte. Here, the electrolyte may include a lithium salt such as LiPF6 or LiBF4 in an organic solvent such as, for example, ethylene carbonate (EC), propylene carbonate (PC), diethyl carbonate (DEC), ethyl methyl carbonate (EMC), or dimethyl carbonate (DMC).

Figure 5:
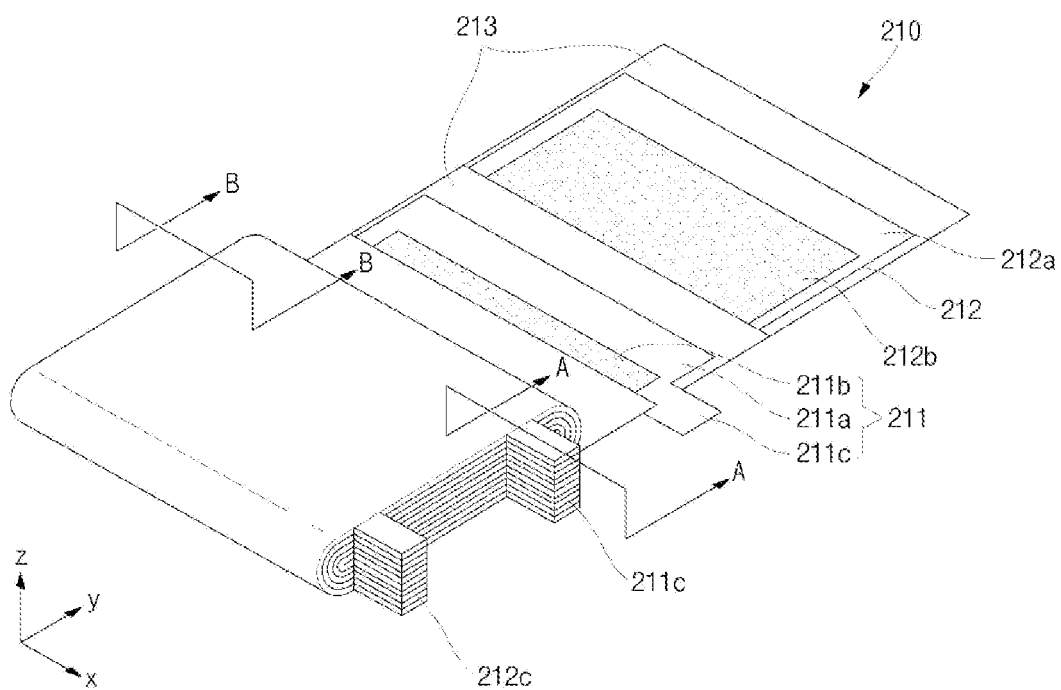
FIG. 5 is a perspective view illustrating another example of an electrode assembly that can be applied to the secondary battery shown in FIG. 1B.

Referring to FIG. 5, another example of an electrode assembly 210 that can be applied to the example secondary battery 100 shown in FIG. 1 is shown. As shown in FIG. 5, the electrode assembly 210 may be formed by stacking a positive-electrode plate 211, a separator 213, and a negative-electrode plate 212, and then winding the stacked body in a jelly-roll configuration.

Here, the positive-electrode plate 211 is formed by coating a positive-electrode active material 211b such as graphite or carbon on a positive-electrode collector 211a formed of a metal foil such as aluminum and includes a positive-electrode uncoated portion 211c that is a region to which the positive-electrode active material 211b is not applied. The positive-electrode plate 211 is formed by coating the positive-electrode active material 211b on the positive-electrode collector 211a, which is a roll-shaped metal foil, and then a plurality of positive-electrode tabs 211c may be formed by blanking. The positive-electrode tabs 211c may serve as passages for current flow between the positive-electrode plate 211 and the outside of the positive-electrode plate 211. The positive-electrode tabs 211c may be formed every turn of the wound electrode assembly 210, and may protrude a predetermined length in the longitudinal direction (x) parallel to the winding axis of the electrode assembly 210. The positive-electrode tabs 211c of a plurality of wound positive-electrode plates 211 may be aligned at the same position in the height direction (z) in the electrode assembly 210.

Here, the negative-electrode plate 212 is formed by applying a negative-electrode active material 212b such as a transition metal oxide to the negative-electrode current collector plate 212a formed of a metal foil such as aluminum, and includes a negative-electrode uncoated portion 212c, which is a region where the negative-electrode active material 212b is not applied. The negative-electrode plate 112 may be formed by applying the negative-electrode active material 212b to the negative-electrode collector 212a, which is a roll-shaped metal foil, and may have a plurality of negative-electrode tabs 212c formed by blanking. The negative-electrode tabs 212c may serve as passages for current flow between the negative-electrode plate 212 and the outside of the negative-electrode plate 212. The negative-electrode tabs 212c may be formed every turn of the wound electrode assembly 210, and may protrude a predetermined length in the longitudinal direction (x) parallel to the winding axis of the electrode assembly 210. The negative-electrode tabs 212c may be positioned from one end of the electrode assembly 210 in the longitudinal direction (x) to the other side in the width direction (y). The negative electrode tabs 212c of the wound negative-electrode plates 212 may be aligned at the same position in the height direction (z) in the electrode assembly 210.

The separator 213 is positioned between the positive-electrode plate 211 and the negative-electrode plate 212 to prevent an electric short and to enable the movement of transition metal ions, and is made of polyethylene, polypropylene, or a composite film of polyethylene and polypropylene. Meanwhile, in the present invention, the material of the separator 213 is not limited.

In order to more securely prevent a short circuit between the positive-electrode plate 211 and the negative-electrode plate 212, the separator 213 may be formed to have a wider width and longer length than the positive-electrode plate 211 and the negative-electrode plate 212 in both of the longitudinal direction (x) and the width direction (y). That is, the separator 113 may be larger than the positive-electrode plate 111 and the negative-electrode plate 112 in a plan view.

One end of the separator 113 in the longitudinal direction (x) may have a larger thickness than other areas. In addition, the other end of the separator 113 in the longitudinal direction (x) may have the same thickness as other areas of the separator 113, except for the one end, or may have the same thickness as the one end of the separator 113 in the longitudinal direction (x).

Here, a cross-sectional view taken along line A-A of the electrode assembly 210 may be the same as any one cross-sectional view of the electrode assembly 110 shown in FIGS. 3A to 3D. Also, a cross-sectional view taken along line B-B of the electrode assembly 210 may be the same as any one cross-sectional view of the electrode assembly 110 shown in FIG. 4A or 4B. Also, any one of the shapes of the separators of FIGS. 3C to 3D may be applied to the shape of the separator 213 in the cross-sectional view taken along line B-B of the electrode assembly 210. That is, the cross-sectional view of the electrode assembly 210 may be the same as that of the electrode assembly 110 shown in FIGS. 3A to 3D and 4A and 4B.

The electrode assembly 210 may have increased insulation thicknesses at both end portions and corner portions in the longitudinal direction (x) by the insulator provided in the separator 213, which is advantageous against short-circuiting by enhancing the cushion function. In addition, by the insulator formed on the separator 113, the electrode assembly 210 may prevent burrs, which may occur on a positive or negative electrode tab 211c or 212c formed by blanking, from penetrating the separator 213, thereby improving electric stability.

What has been described above is merely an embodiment for implementing the electrode assembly according to the present invention and the secondary battery including same, and the present invention is not limited to the foregoing embodiment. Rather, a person skilled in the art to which the present invention pertains will appreciate that various modification can be made without departing from the spirit and scope of the present invention as defined by the following claims.

INDUSTRIAL APPLICABILITY

The present invention can be used in the field of an electrode assembly and a secondary battery including same.

The invention claimed is:

1. An electrode assembly comprising:
a positive-electrode collector;
a positive-electrode plate which has a positive-electrode active material and a positive-electrode tab protruding from a longitudinal end thereof, the positive-electrode active material being formed to cover a part of the positive-electrode collector, and the positive-electrode tab being a positive-electrode uncoated portion having no positive-electrode active material formed thereon;
a negative-electrode collector;
a negative-electrode plate which has a negative-electrode active material and a negative-electrode tab protruding from a longitudinal end thereof, the negative-electrode active material being formed to cover a part of the negative-electrode collector, and the negative-electrode tab being a negative-electrode uncoated portion having no negative-electrode active material formed thereon; and
a separator which is interposed between the positive-electrode plate and the negative-electrode plate,
wherein the separator has an insulator provided on a longitudinal end thereof, wherein a thickness of the insulator is same as or smaller than a thickness of the positive-electrode active material or the negative-electrode active material, wherein the insulator is attached to an upper layer of the separator and further attached to a lower layer of the separator.

2. An electrode assembly comprising:
a positive-electrode collector;
a positive-electrode plate which has a positive-electrode active material and a positive-electrode tab protruding from a longitudinal end thereof, the positive-electrode active material being formed to cover a part of the positive-electrode collector, and the positive-electrode tab being a positive-electrode uncoated portion having no positive-electrode active material formed thereon;
a negative-electrode collector;
a negative-electrode plate which has a negative-electrode active material and a negative-electrode tab protruding from a longitudinal end thereof, the negative-electrode active material being formed to cover a part of the negative-electrode collector, and the negative-electrode tab being a negative-electrode uncoated portion having no negative-electrode active material formed thereon; and
a separator which is interposed between the positive-electrode plate and the negative-electrode plate,
wherein the separator has an insulator provided on a longitudinal end thereof, wherein a thickness of the insulator is same as or smaller than a thickness of the positive-electrode active material or the negative-electrode active material,
wherein the insulator is spaced apart from the positive-electrode active material and the negative-electrode active material,
wherein the insulator is attached to an upper layer of the separator and further attached to a lower layer of the separator.

3. The electrode assembly of claim 1, further including an additional insulator that is thicker than an area having a different thickness at a second end in a longitudinal direction.

4. The electrode assembly of claim 3, wherein the additional insulator is formed to have a same thickness as or as same shape as the insulator.

5. The electrode assembly of claim 1, wherein the electrode assembly has a rectangular parallelepiped shape in which the positive-electrode plate, the separator, the negative-electrode plate, and the separator are sequentially stacked multiple times.

6. The electrode assembly of claim 1, wherein the electrode assembly is formed in a jelly-roll configuration in which the positive-electrode plate, the separator, the negative-electrode plate and the separator are stacked and then wound.

7. A secondary battery comprising the electrode assembly of claim 1.

8. The electrode assembly of claim 2, further including an additional insulator that is thicker than an area having a different thickness at a second end in a longitudinal direction.

9. The electrode assembly of claim 8, wherein the additional insulator is formed to have a same thickness as or as same shape as the insulator.

10. The electrode assembly of claim 2, wherein the electrode assembly has a rectangular parallelepiped shape in which the positive-electrode plate, the separator, the negative-electrode plate, and the separator are sequentially stacked multiple times.

11. The electrode assembly of claim 2, wherein the electrode assembly is formed in a jelly-roll configuration in which the positive-electrode plate, the separator, the negative-electrode plate and the separator are stacked and then wound.

12. A secondary battery comprising the electrode assembly of claim 2.

* * * * *